United States Patent
Davidson et al.

(10) Patent No.: US 6,869,501 B2
(45) Date of Patent: Mar. 22, 2005

(54) CONTINUOUS PROCESS FOR CONTROLLED CONCENTRATION OF COLLOIDAL SOLUTIONS

(75) Inventors: Robert S. Davidson, Edina, MN (US); Danny B. Anderson, No. St. Paul, MN (US); Richard A. Gerth, White Bear Lake, MN (US); David R. Holm, Hudson, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 432 days.

(21) Appl. No.: 10/028,216

(22) Filed: Dec. 20, 2001

(65) Prior Publication Data

US 2003/0131948 A1 Jul. 17, 2003

(51) Int. Cl.$^7$ .............................. B01D 3/06; B01D 3/42
(52) U.S. Cl. ...................... 159/2.1; 159/17.1; 159/47.1; 159/DIG. 8; 203/2; 203/71; 203/88; 122/40
(58) Field of Search .................... 159/2.1, 44, 17.1, 159/47.1, 48.2, DIG. 8; 122/40; 210/774; 203/2, 71, 88

(56) References Cited

U.S. PATENT DOCUMENTS

| | | |
|---|---|---|
| 3,036,057 A | 5/1962 | Wallace |
| 3,201,365 A | 8/1965 | Charlesworth et al. |
| 3,444,052 A | 5/1969 | Bracken et al. |
| 3,453,184 A | 7/1969 | Gemassmer et al. |
| 3,470,070 A | 9/1969 | Heckart |
| 3,493,470 A | 2/1970 | Irvin |
| 3,495,648 A | 2/1970 | Amadon |
| 3,538,193 A | 11/1970 | Meredith |
| 3,582,365 A | 6/1971 | Lindsey |
| 3,585,104 A | 6/1971 | Kleinert |
| 3,586,089 A | 6/1971 | Mato et al. |
| 3,618,588 A | 11/1971 | Anwar et al. |
| 3,634,300 A | 1/1972 | Fischer et al. |
| 3,635,917 A | 1/1972 | Roth et al. |
| 3,642,492 A | 2/1972 | Arndt |
| 3,656,534 A | 4/1972 | Bain et al. |
| 3,668,161 A | 6/1972 | Nauman et al. |
| 3,709,706 A | 1/1973 | Sowman |
| 3,738,409 A | 6/1973 | Skidmore |
| 3,773,658 A | 11/1973 | Vu et al. |

(List continued on next page.)

FOREIGN PATENT DOCUMENTS

BE          804182          2/1974

(List continued on next page.)

OTHER PUBLICATIONS

Kirk–Othmer. Encyclopedia of Chemical Technology, Fourth Edition, John Wiley & Sons, 1993, vol. 6, pp. 814, 817, 828.

(List continued on next page.)

Primary Examiner—Virginia Manoharan
(74) Attorney, Agent, or Firm—Douglas B. Little

(57) ABSTRACT

A process for evaporating a portion of a colloidal solution, said process including: a) passing a colloidal solution, said colloidal solution including particles in a liquid medium, wherein at least a portion of said liquid medium includes at least one volatile component, through one or more orifices into an evaporation zone that has at least one inner surface, wherein said colloidal solution does not substantially contact said at least one inner surface of said evaporation zone as said colloidal solution is passed through said evaporation zone; b) applying pressure in said evaporation zone that is lower than the vapor pressure of said colloidal solution as it is passed into said evaporation zone, allowing for flash evaporation of at least a portion of said at least one volatile component from said colloidal solution; c) adjusting the pressure in said evaporation zone to evaporate an amount of said at least one volatile component from said colloidal solution; and d) collecting the remaining colloidal solution from said evaporation zone.

15 Claims, 1 Drawing Sheet

U.S. PATENT DOCUMENTS

| | | |
|---|---|---|
| 3,795,524 A | 3/1974 | Sowman |
| 3,799,234 A | 3/1974 | Skidmore |
| 3,852,503 A | 12/1974 | Magnino et al. |
| 3,853,839 A | 12/1974 | Magnino et al. |
| 3,857,704 A * | 12/1974 | Coulter .................... 75/721 |
| 3,862,014 A | 1/1975 | Atkins et al. |
| 3,893,940 A | 7/1975 | Ohogoshi et al. |
| 3,901,673 A | 8/1975 | Zahn et al. |
| 3,941,664 A | 3/1976 | Scoggin |
| 3,947,376 A | 3/1976 | Albrecht |
| 3,966,538 A | 6/1976 | Hagberg |
| 4,038,129 A | 7/1977 | Wreszinski |
| 4,047,965 A | 9/1977 | Karst et al. |
| 4,086,414 A * | 4/1978 | Hornbaker et al. ......... 528/500 |
| 4,255,314 A | 3/1981 | Miyoshi et al. |
| 4,294,652 A | 10/1981 | Newman |
| 4,314,827 A | 2/1982 | Leitheiser et al. |
| 4,375,524 A | 3/1983 | Rowe |
| 4,394,219 A | 7/1983 | Mix et al. |
| 4,414,341 A | 11/1983 | Williams |
| 4,495,028 A | 1/1985 | Rowe |
| 4,522,743 A | 6/1985 | Horn et al. |
| 4,555,309 A | 11/1985 | Jain |
| 4,558,423 A | 12/1985 | Jain |
| 4,629,663 A | 12/1986 | Brown et al. |
| 4,686,086 A | 8/1987 | Rowe |
| 4,692,482 A | 9/1987 | Lohrengel |
| 4,931,414 A | 6/1990 | Wood et al. |
| 4,954,462 A | 9/1990 | Wood et al. |
| 5,061,472 A | 10/1991 | Lailach et al. |
| 5,256,386 A | 10/1993 | Nystrom et al. |
| 5,368,668 A | 11/1994 | Tochacek et al. |
| 5,624,534 A * | 4/1997 | Boucher et al. ............ 202/153 |
| 5,723,433 A | 3/1998 | Duvall et al. |
| 5,730,836 A | 3/1998 | Greig et al. |
| 5,955,135 A | 9/1999 | Boucher et al. |
| 5,968,312 A | 10/1999 | Sephton |
| 6,454,907 B1 * | 9/2002 | Erdman ....................... 203/1 |

FOREIGN PATENT DOCUMENTS

| | | |
|---|---|---|
| DE | 25 11 846 | 3/1975 |
| DE | 199 47 846 A1 | 4/2001 |
| EP | 0 939 287 A1 | 9/1999 |
| JP | 51018781 | 2/1976 |
| JP | 54 025270 | 2/1979 |
| JP | 54 123577 | 9/1979 |
| JP | 56 058501 | 5/1981 |
| JP | 59 213711 | 12/1984 |
| JP | 89019682 | 12/1989 |
| JP | 8164301 | 6/1996 |
| SU | 1348616 | 3/1986 |
| WO | WO 00/62886 | 10/2000 |

OTHER PUBLICATIONS

Robert C. Reid, et al., "The Properties of Gases and Liquids." Fourth Edition, McGraw Hill, Inc., 1987, Chap. 7, pp. 205–209, Chap. 8, pp. 241, 250–251, and Appendix A, pp. 656–661.

Jennifer A. Lewis, "Colloidal Processing of Ceramics," J. Am. Ceram. Soc., 83 [10], 2341–59 (2000).

A.L. Yarin et al., "Bubble Nucleation During Devolatilization of Polymer Melts," AICHE Journal, vol. 45, No. 12, Dec. 1999, pp. 2590–2605.

* cited by examiner

CONTINUOUS PROCESS FOR CONTROLLED CONCENTRATION OF COLLOIDAL SOLUTIONS

FIELD OF THE INVENTION

The present invention relates to the concentration of colloidal solutions. In particular, the present invention is a method for evaporating a desired portion of a colloidal solution.

BACKGROUND OF THE INVENTION

Colloidal solutions are between a true solution and a suspension. They are a dispersion of particles in a liquid medium where the size of the particles (or "colloids") is between about 1 and about 1000 nanometers. They include, but are not limited to, sols, and aqua-sols or hydrosols of metal oxides (or precursors thereof). Sols, in particular, are colloidal solutions containing particles between about 1 and about 100 nanometers in size.

Often when a colloidal solution is prepared, it is present in a relatively dilute concentration for ease in handling. Subsequent processing techniques to which the colloidal solution may eventually be subjected, however, may necessitate that the colloidal solution be concentrated.

Current methods of concentrating colloidal solutions are by sedimentation, filtration, centrifugation, and various evaporation method including batch evaporation or by continuous evaporation using parallel plate evaporators, extruders, wiped film evaporators, thin film evaporators, rotoevaporators, rising film evaporators and falling film evaporators. A problem with these known evaporators is that they are particularly difficult to use with materials that show large increases in viscosity with small changes in concentration, as is typical of colloidal solutions.

Another problem with the known evaporators is that the colloidal solution may be over-evaporated. Over-evaporation may occur for more than one reason. For instance, one reason is that as the colloidal solution is being concentrated, it is often in contact with a heated or hot surface in the evaporation zone. This may result in over-evaporation. When something is "overevaporated," it is more evaporated than desired. Over-evaporation may also be the result of the known evaporators not having sufficient control to precisely evaporate a specific amount of material. A consequence of over-evaporation is that it may result in some of the colloidal solution being degraded (decomposed, e.g. burned). The degraded remains of the colloidal solutions may foul the evaporation equipment and the concentrated colloidal solution. Concentrated colloidal solutions substantially lacking such contaminates are necessary for certain ultimate uses of the materials. Over-evaporation may also result in premature gellation of the colloidal solution.

Another problem with known evaporators is under-evaporation of colloidal solutions. When something is "underevaporated," it is less evaporated than desired. A negative result of under-evaporation is, for example, that the resultant article formed from the under-evaporated colloidal solution may not be able to hold its desired shape.

Current processes generally use evaporator temperature to control the evaporation to reach the desired level of evaporation of the colloidal solution. For example, evaporation may be done by rotoevaporation, which involves evaporating liquid from a heated, rotating vessel into a cooled receiving flask. The problem with using temperature to control the amount of evaporation is that the system is slow to respond to a change in temperature.

SUMMARY OF THE INVENTION

The present invention provides a controlled method for evaporating a desired amount of a colloidal solution. The method also substantially reduces or eliminates over-evaporation. The invention allows vapor (of at least one volatile component of the colloidal solution) to be evaporated from the colloidal solution without the colloidal solution substantially contacting an inner surface(s) of the evaporation zone (a "zone" is a chamber, enclosed area, etc.). This avoids over-evaporation of the colloidal solution, degrading of the colloidal solution in the evaporation zone, and fouling of the equipment due to degradation of the colloidal solution.

In the present invention, "volatile" component means that the component is volatile at the temperature at which the component enters the evaporation zone and at the pressure in the evaporation zone.

The present invention provides controlled evaporation of colloidal solutions. Therefore, it also substantially avoids under-evaporation of the colloidal solutions.

The invention controls the concentration of the colloidal solutions by controlling pressure in an evaporation zone, primarily, and temperature of the colloidal solution as it is fed into the evaporation zone, optionally. Using pressure to control the evaporation is particularly desired because it enables the process to be more quickly adjusted than when primarily using temperature to control the process.

The invention is a process for evaporating a portion of a colloidal solution, said process comprising: a) passing a colloidal solution, said colloidal solution comprising particles in a liquid medium, wherein at least a portion of said liquid medium comprises at least one volatile component, through one or more orifices into an evaporation zone that has at least one inner surface, wherein said colloidal solution does not substantially contact said at least one inner surface of said evaporation zone as said colloidal solution is passed through said evaporation zone; b) applying pressure in said evaporation zone that is lower than the vapor pressure of said colloidal solution as it is passed into said evaporation zone, allowing for flash evaporation of at least a portion of said at least one volatile component from said colloidal solution; c) adjusting the pressure in said evaporation zone to evaporate an amount of said at least one volatile component from said colloidal solution; and d) collecting the remaining colloidal solution from said evaporation zone.

One advantage of at least one embodiment of the present invention is that the process reaches a steady state quickly, and may make a large quantity of uniform material without repeatedly stopping the process to take a sample and have it analyzed to determine whether the desired amount of evaporation has been achieved. It also eliminates the problem of having a large amount of material wasted if too much evaporation has been achieved.

Another advantage of at least one embodiment of the present invention is its controllability. The pressure in the evaporation zone can be adjusted quickly, allowing the vaporization rate to be adjusted quite quickly. The amount of evaporation, as measured directly or as inferred by measurements of properties such as viscosity, can be regulated by manipulating both the evaporation zone pressure and, optionally, the temperature of the colloidal solution as it is passed to the evaporation zone.

Another advantage of at least one embodiment is that the control scheme allows for regulation of the level of evaporation of the post-evaporation or remaining colloidal solution to tight tolerances by manipulating the system pressure and optionally the temperature of the incoming liquid.

Yet another advantage of the present inventive method is that the amount of control over the final level of evaporation of the colloidal solution eliminates the need to recycle the colloidal solution back through the process a second or multiple times to achieve the desired level of evaporation.

DETAILED DESCRIPTION OF THE INVENTION

Figure 1:
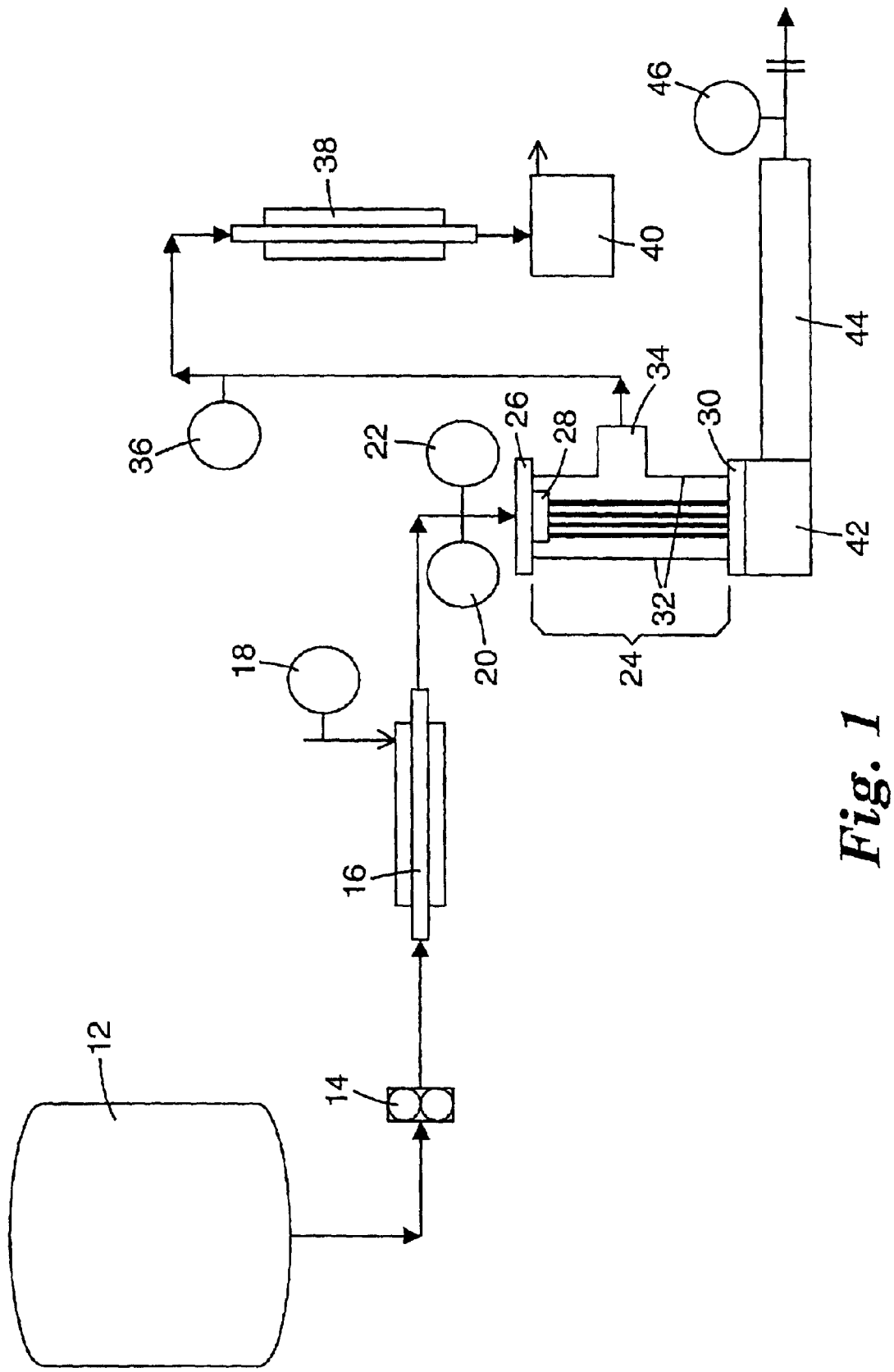
FIG. 1 is a process flow diagram of an embodiment of the present inventive method.

An embodiment of the present invention is illustrated in FIG. 1 by a process flow diagram. In this embodiment, an unconcentrated colloidal solution is placed in a preconcentrator 12. The bulk of at least one volatile component of the colloidal solution (may be water, aqueous media or solvent media, etc.) may be removed in this step. This preconcentration step, however, is optional depending upon the starting concentration or level of dilution of the colloidal solution.

The colloidal solution is then pumped, using a pump 14, to a heating zone 16 where it is heated. A temperature sensor 18 monitors or senses the temperature of the heating zone. The colloidal solution is kept under sufficient pressure in the heating zone 16 to keep the colloidal solution from boiling there. The heating step, however, is optional.

There is a pressure sensor 20 and another temperature sensor 22 in the system prior to the evaporation zone 24, which are used to sense the pressure and the temperature of the colloidal solution prior to entering the evaporation zone 24. The colloidal solution is then passed into the evaporation zone 24 through an inlet 26 and a die 28 comprising one or more orifices. The die 28 is constructed such that the pressure drop through the die should prevent the colloidal solution from boiling until it has nearly entered, or has entered, the evaporation zone. The die should also be constructed to feed the colloidal solution in a manner such that the colloidal solution does not substantially contact the inner surface or surfaces 32 of the evaporation zone 24 as the colloidal solution falls or passes through the evaporation zone 24. In order for the flash evaporation of the colloidal solution to take place in the evaporation zone 24, pressure is controlled in the evaporation zone 24 such that it is lower than the vapor pressure of the heated colloidal solution as it enters the inlet 26. The colloidal solution is cooled by evaporation as it passes through the evaporation zone 24, and then goes through an outlet 30.

A vapor exit port 34 is attached to the evaporation zone 24 where the vapor (of the at least one volatile component of the colloidal solution) that was evaporated out of the colloidal solution in the evaporation zone 24 is removed from the evaporation zone 24. Another pressure sensor 36 is located outside of the vapor exit port 34 or could be somewhere connected to the evaporation zone 24 itself, and is used to sense the pressure in the evaporation zone 24 or the pressure just outside of it. In order for the vapor to exit the evaporation zone 24 the pressure needs to be lower outside of the evaporation zone 24 than inside. The lower pressure outside of the evaporation zone 24 may be provided by a pressure control or vacuum system 40 that is connected to the system via a condenser 38 where most of the vapor is condensed for removal. Alternatively, the vapors may pass directly to the pressure control or the vacuum system.

The remaining (or post-evaporation) colloidal solution is collected in a collection vessel 42. It is then pumped out of the system by a pump 44. A conditions sensor 46 senses, measures or infers such things as viscosity, pressure and concentration of the remaining (or post-evaporation) colloidal solution and is found at or near the exit for the concentrated colloidal solution or is attached to the collection vessel 42. The conditions sensor 46 can in some cases be used to measure or infer the viscosity and concentration of the colloidal solution to confirm that the desired level of evaporation has occurred. The final level of evaporation of the remaining (or post-evaporation) colloidal solution will depend upon the processing techniques to which the remaining colloidal solution will be subjected. The remaining colloidal solution can then be subsequently used or processed as desired.

Colloidal Solution

The colloidal solution that may be concentrated using the present inventive method comprises particles suspended in a liquid medium wherein at least a portion of the liquid medium comprises at least one volatile component. Some examples of particles include metal, magnetic powders, catalysts, ceramics, minerals, oil recovery, technical glasses, paints and pigments, polymers, pulp and paper, prepared foods, pharmaceuticals, fibers, and detergents. Others include metal oxides, nitrides, carbonates, carbides, silicates, tellurides, etc. Specific examples of these particles include, but are not limited to, silica, alumina, zirconia, titanium oxide, silicon nitride, magnesium carbonate, titanium carbide, etc. Some examples of the liquid medium are water, aqueous media or solvent media or mixtures thereof. At least a portion of the liquid medium comprises at least one volatile component. Some examples of non-volatile components that may also be part of the liquid medium include, but are not limited to, polymers, salts, oligomers, and dispersants.

See the following patents, which are all incorporated by reference in full, for exemplary, but not limiting, colloidal solutions that may be used in the present inventive process: U.S. Pat. No. 4,931,414 (Wood et al.), col. 5, lines 47–58, col. 5, line 65-col. 6, line 21, col. 6, lines 31–43; U.S. Pat. No. 4,314,827 (Leithauser et al.), col. 5, line 64-col. 6, line 43; U.S. Pat. No. 3,795,524 (Sowman), col. 4, line 3-col. 5, line 30; U.S. Pat. No. 3,709,706 (Sowman), col. 5, lines 16–28 and 46–57; U.S. Pat. No. 4,047,965 (Karst et al.), col. 4, line 1-col. 7, line 15.

A general discussion of colloidal solutions in general (including possible components and uses) is provided in Kirk-Othmer, Encyclopedia of Chemical Technology, John Wiley & Sons Publ., Vol. 6, 1993, pages 814, 817 and 828, for examples.

Preconcentrating

The preconcentrating step of this inventive method is optional. It may be desired depending upon how dilute the colloidal solution is before being introduced to the inventive process. However, if the colloidal solution is near the desired concentration, and only needs a relatively small amount of evaporation, then the colloidal solution may not be desired to be preconcentrated.

"Preconcentrating" means removing a portion of at least one volatile component in a solution or liquid medium prior to the first step of a process.

The preconcentrating step may be performed using a preconcentrator. Apparatuses that may be used as preconcentrators include conventional evaporation apparatuses used for evaporation of colloidal solutions, such as wiped-film evaporation, forced circulation evaporation and parallel plate evaporation, for examples. Other apparatuses that are capable of preconcentrating a colloidal solution are also possible. The preconcentrating may be done by feeding the colloidal solution through a series of apparatuses, such as tanks, pumps, vessels etc. that together preconcentrate the colloidal solution. For example, the series of apparatuses may include a parallel plate evaporator, as well as pumps, etc.

The bulk of the volatile component(s) of the colloidal solution (water and/or other solvent) may be evaporated in the preconcentrating step.

Heating

The heating step of the present inventive method is also optional. However, if the colloidal solution includes volatile components requiring removal, but the vapor pressure is not sufficiently above the pressure in the evaporation zone, then the heating is used.

The heating step is performed in a heating zone 16. The heating is preferably done by the use of a heat exchanger. The heating step may be performed, however, by any suitable heating means or device. Some examples of other heating means include, but are not limited to, direct steam injection and microwaves.

The temperature of the heating zone is dependent in part on the identity of the volatile components, which are present in the colloidal solution and desired to be evaporated. The colloidal solution is heated to a temperature in the heating zone that is above the boiling point of the colloidal solution at the pressure in the evaporation zone.

The pressure in the heating zone is maintained so that the colloidal solution is not allowed to boil. The range of pressures depends up on the material(s) used and the temperature of the heat exchanger and colloidal solution. Appropriate temperatures and pressures may be calculated using standard thermodynamic relationships. Methods for doing these calculations can be found in references such as, for example, R. C. Reid et al., *The Properties of Gases and Liquids*, 4$^{th}$ Ed., McGraw-Hill, New York, N.Y., 1987, Chapters 7 and 8, and Appendix A.

Evaporation

After the optional preconcentrating step and/or after being optionally heated in the heating zone 16, or as the first step in the process, the colloidal solution is passed through an inlet 26 or conduit, and through a die 28 or nozzle or some sort of orifice(s) into an evaporation zone 24. The die, nozzle or orifice(s) preferably allows for an increase in the surface area of the colloidal solution that is exposed in the evaporation zone as it is passed through the evaporation zone.

The colloidal solution is preferably passed through a die 28 comprising one or more orifices. The die and/or its one or more orifices may be of any suitable shape and configuration that allow the colloidal solution to pass into the evaporation zone 24 and to be flash evaporated without substantially contacting the inner surface(s) 32 of the evaporation zone 24.

An exemplary die has a plurality of orifices or holes that allow the colloidal solution to form strands as the colloidal solution falls or passes through the evaporation zone 24. Another possibility is for the die 28 to have orifices that are slits and allow for sheets of colloidal solution to fall or pass through the evaporation zone 24. These exemplary designs of the die 28 allow more surface area of colloidal solution to be exposed in the evaporation zone 24, which allows for more evaporation of the colloidal solution in a shorter amount of time. Other configurations of the die 28 and its orifice or orifices are also contemplated for this invention.

The evaporation step relies on the mechanism wherein the energy initially in, or absorbed by the colloidal solution during the optional heating step, is preserved by maintaining a back pressure on the colloidal solution to prevent vaporization of the water, aqueous media or solvent media in the inlet, and is subsequently released in the evaporation zone causing evaporation of the water, aqueous media and/or solvent media. The number and size of the orifices in the die 28 affect the back pressure that is maintained upstream. The back pressure must be sufficient to keep the colloidal solution from boiling.

A multi-orifice die may be preferred, particularly because the colloidal solution is to be concentrated in a single pass through the evaporation zone. Selection of the number and size of the orifices is used to achieve the desired pressure to prevent boiling of the colloidal solution prior to entering the evaporation zone.

The pressure in the evaporation zone 24 is controlled so that when the heated colloidal solution enters the evaporation zone 24 it flash evaporates. The greater the temperature of the colloidal solution evaporation, the faster will be the rate of evaporation. Flash evaporation is an elementary step in chemical processing in which volatile components, for example, unreacted monomers, solvents or species, are removed. In the case of colloidal solutions, the change in pressure allows for flash evaporation of the water and/or solvent and other volatile components from the colloidal solution, resulting in concentration of the colloidal solution.

The pressure necessary for flash evaporation depends upon the composition of the colloidal solution and the temperature of the colloidal solution. The material in the colloidal solution may be temperature sensitive, and therefore may degrade if it is exposed to a temperature that is too high. Therefore, it may be desirable to limit the temperature of the colloidal solution. However, for the colloidal solution to flash evaporate, or boil, as it enters the evaporation zone, the pressure in the evaporation zone must be lower than the vapor pressure of the colloidal solution (which depends on the temperature of the colloidal solution) as it enters the evaporation zone. The exact desired level of pressure in the evaporation zone, however, also depends upon other variables. (The vapor pressure can be calculated using, for example, the calculations set forth in Reid et al., The Properties of Gases and Liquids, McGraw-Hill Book Co., 4$^{th}$ ed., Chapters 7 and 8, and Appendix A (which are incorporated herein by reference)). In many cases, it is advantageous for this pressure to be below atmospheric pressure, so heating is not required.

The evaporation zone 24 shown in FIG. 1 is not insulated or heated. However, the evaporation zone of the present invention may be insulated and/or heated to avoid or reduce condensation on the inner surface or surfaces of the evaporation zone.

The final level of evaporation of the colloidal solution depends on the processing techniques to which the remaining (or post-evaporation) colloidal solution will be subjected. There may be many factors which interact in selecting the target level of evaporation and the present invention can be employed to achieve whatever level of evaporation is finally selected.

Continuous Adjustment

The pressure and, optionally, temperature of the inventive process are periodically or continuously controlled and manually or automatically controlled. This is done using a plurality of temperature and pressure sensors, as described above. In addition a conditions sensor may be used to monitor the conditions or properties of the remaining (or post-evaporation) colloidal solution. The sensors may be part of a control system(s) that can regulate the pressure and temperature of the colloidal solution, evaporation zone, etc. In an exemplary embodiment one or more variables in the inventive process (pressures, temperatures) are regulated by automatic control systems, the set points having been manually supplied by an operator. In another exemplary embodiment, one or more of the closed-loop systems that regulate temperature and pressure will receive set points from another control system, based on directly measured or inferred properties of the post-evaporation colloidal solution. In another exemplary embodiment, the entire inventive process will be controlled by an automatic control system, based on measurements of temperature, pressure, and properties of the post-evaporation colloidal solution. The operator will specify a desired property (such as viscosity) of the post-evaporation colloidal solution and the control system will automatically regulate process variables in such a way as to achieve the desired property.

The control system may comprise a single multivariable controller, or several independent single-loop controllers, or a combination of controller types.

Collection

The remaining liquid colloidal solution (post-evaporation) is collected in the collection vessel 42 or zone. A pump may be mounted at, in, or after the collection vessel. A suitable pump should be able to remove a high viscosity liquid from the collection vessel and pass it at a higher pressure into an ultimate collection vessel. This may be done continuously. The post-evaporation colloidal solution could instead be periodically pumped from the collection vessel. It also could alternatively be manually removed from the collection vessel without the use of a pump.

EXAMPLES

This invention is further illustrated by the following examples, which are not intended to limit the scope of the invention. In the examples, all parts, ratios and percentages are by weight unless otherwise indicated. The following test methods were used to characterize the compositions in the following examples:

Dried Solids

A weighed amount of wet material was placed in a small, tared aluminum pan that was placed overnight in a vacuum oven at 75° C. and approximately 2.7 kiloPascals (kPa) pressure. The pan and remaining material were cooled and weighed, and the weight of the dried solid was calculated.

$$\text{Percent Dried Solid} = \frac{\text{(Weight of Dry Solid)}(100\%)}{\text{Weight of Wet Material}}$$

Fired Solids

A weighed amount of wet material was placed in a small, tared ceramic crucible. It was placed in a programmable furnace set with the following temperature profile:

Heat at a rate of ½° C. per minute to 120° C.

Hold at 120° C. for 4 hours

Heat at a rate of 4° C. per minute to 1000° C.

Hold at 1000° C. for 10 minutes

Cool

The crucible and remaining material were cooled and weighed, and the weight of the fired solid was calculated.

$$\text{Percent Fired Solid} = \frac{\text{(Weight of Fired Solid)}(100\%)}{\text{Weight of Wet Material}}$$

The following processes were used to make the examples:

Process A

The material to be concentrated was placed in a 50 mL syringe that was used to continuously feed the evaporator. The feed was heated by passing it through a heat exchanger (custom made) having a length of about 1020 mm (40 in) and made of a stainless steel tube having an outer diameter of about 6.4 mm (0.25 in) mounted in a larger diameter tube through which heated water could be passed. The material next passed through a die (custom made) comprising stainless steel tubing with a length of about 51-mm (2 in) and an outer diameter of about 3.2 mm (0.125 in). The end of the die was crimped to form an orifice having a diameter of about 1.09 mm (0.043 in) as it entered one end of an evaporation zone of the evaporator. The evaporation zone comprised a glass tee (custom made) that had a length of about 180 mm (7 in), a diameter of about 76 mm (3 in) and a side arm extending laterally about midway down the length. The side arm of the glass tee was connected to a water aspirator vacuum system (custom-made). The concentrated material was collected in a collection vessel, a chamber after the exit of the evaporation zone.

Process B

The material to be concentrated was placed in a pressurized, jacketed feed vessel kept at 240 kPa (20 psig) and 40° C. This material was continuously fed to the evaporator using a gear pump (B-Series Gear Pump Model BPB with a capacity of 2.92 cubic centimeters per revolution, available from Zenith Products Div. of Parker Hannifin, Sanford, N.C.) to meter the flow of material. The feed was heated by passing through a heat exchanger consisting of two consecutive sections of jacketed tubing having an outer diameter of about 25 mm (1 in). The first section was about 510 mm (20 in) long and the second was about 585 mm (23 in) long and contained a static mixer (Model SMX available from Koch Engineering Co. Inc., Wichita, Kans.) to obtain uniform temperature. The material next passed through a die containing 12 holes, each having a diameter of about 1.6 mm (0.0625 in) and arranged in the pattern of a circle with a diameter of about 25 mm (1 in), and into an evaporation zone. The evaporation zone comprised a glass tee that had a length of about 305 mm (12 in), a diameter of about 152 mm (6 in) and a side arm extending laterally about midway down the length. The side arm of the glass tee was connected to a water-cooled condenser that was connected to a vessel to collect the condensate and to a vacuum system. The concentrated material was collected in the collection vessel and was continuously removed from the collection zone while it was under vacuum using a progressive cavity pump (Seepex Model BT05 available from Seeberger GmbH+ Co., Bottrop, Germany).

Example 1

Ceramic Colloid, No Heating

A ceramic colloid was prepared by addition of 163 g of boehmite (DISPERSAL™ 20 from Sasol GmbH, Hamburg, Germany) to a solution of 7.2 g of 70% nitric acid in 336 g of deionized water, followed by addition of 75 g methanol. This material was then processed according to Process A. The material was continuously fed through the heat exchanger (but with no heating), through the die and into the evaporation zone at one set of conditions. The product was then removed from the collection vessel. The pressure in the evaporation zone was then readjusted to produce products of different concentrations. For each set of conditions, samples of product were taken and analyzed for percent dried solids. The results are shown in Table 1.

TABLE 1

| Sample | Inlet Concentration (% Dried Solids by wt.) | Feed Temperature (C.) | Evaporation Zone Pressure (kPa) | Outlet Concentration (% Dried Solids by wt.) |
|---|---|---|---|---|
| 1 | 28.23 | 23 | 2.8 | 29.51 |
| 2 | 28.23 | 23 | 2.8 | 29.09 |
| 3 | 28.23 | 21 | 5.2 | 28.43 |
| 4 | 28.23 | 22 | 5.3 | 28.30 |
| 5 | 28.23 | 22 | 8.0 | 28.26 |

As seen, the output concentration of a ceramic colloid could be varied with small changes in the pressure in the evaporation zone alone. Substantially no dried material was observed on the inner surfaces of the evaporation zone.

Example 2

Food Hydrocolloid

A food colloid was prepared by mixing 25.8 g corn starch (ARGO CORN STARCH™ from Best Foods, Englewood Cliffs, N.J.), 42.8 g granulated sugar (CRYSTAL SUGAR GRANULATED SUGAR™ from United Sugars Corp., Minneapolis, Minn.), and 435.8 g distilled water. This mixture was heated at atmospheric pressure with constant stirring to 95° C. to cause it to begin to increase in viscosity. The material was then cooled to room temperature. This material then processed according to Process A. The material was continuously fed through the heat exchanger, through the die and into the evaporation zone at one set of conditions of temperature and pressure. The product was then removed from the collection zone or vessel. The temperature in the heating zone and the pressure in the evaporation zone were then readjusted to produce products of different concentrations. For each set of conditions, samples of product were taken and analyzed for percent dried solids. The result are shown in Table 2.

TABLE 2

| Sample | Inlet Concentration (% Dried Solids by wt.) | Heat Exchanger Temperature (C.) | Evaporation Zone Pressure (kPa) | Outlet Concentration (% Dried Solids by wt.) |
|---|---|---|---|---|
| 1 | 14.72 | 50 | 2.7 | 15.61 |
| 2 | 14.72 | 50 | 2.7 | 15.87 |
| 3 | 14.72 | 50 | 4.8 | 15.30 |
| 4 | 14.72 | 50 | 6.7 | 15.10 |
| 5 | 14.72 | 50 | 8.0 | 15.08 |
| 6 | 14.72 | 51 | 5.2 | 15.32 |
| 7 | 14.72 | 60 | 2.7 | 15.83 |
| 8 | 14.72 | 60 | 2.7 | 16.02 |
| 9 | 14.72 | 60 | 5.1 | 15.52 |
| 10 | 14.72 | 60 | 5.9 | 15.42 |
| 11 | 14.72 | 60 | 6.9 | 15.35 |
| 12 | 14.72 | 60 | 8.7 | 15.29 |
| 13 | 14.72 | 68 | 5.3 | 15.72 |
| 14 | 14.72 | 68 | 5.3 | 15.63 |
| 15 | 14.72 | 68 | 7.3 | 15.45 |
| 16 | 14.72 | 68 | 7.9 | 15.48 |
| 17 | 14.72 | 69 | 2.7 | 16.06 |
| 18 | 14.72 | 69 | 2.7 | 16.05 |

As seen, the output concentration of a food hydrocolloid could be varied with small changes in the pressure in the evaporation zone alone or in combination with small changes in the temperature of the input material. Substantially no dried material was observed on the inner surface of the evaporation zone.

Example 3

Organic-Inorganic Hydrocolloid

A colloid was prepared by mixing 50.1 g corn starch (ARGO CORN STARCH™), 225.4 g baking soda (ARM & HAMMER PURE BAKING SODA™ from Arm and Hammer Div. of Church & Dwight Co., Princeton, N.J.), and 224.7 g distilled water. This mixture was heated at atmospheric pressure with constant stirring to 70° C. to cause it to begin to bubble vigorously. The material was then cooled to 60° C. and stirred until the viscosity began to increase. The material was then cooled to room temperature. This material was then processed according to Process A. The material was continuously fed through the heat exchanger, through the die and into the evaporation zone at one set of conditions of temperature and pressure. The product was then removed from the collection zone. The temperature in the heating zone and the pressure in the evaporation zone were then readjusted to produce products of different concentrations. For each set of conditions, samples of product were taken and analyzed for percent dried solids. The results are shown in Table 3.

TABLE 3

| Sample | Inlet Concentration (% Dried Solids by wt.) | Heat Exchanger Temperature (C.) | Evaporation Zone Pressure (kPa) | Outlet Concentration (% Dried Solids by wt.) |
|---|---|---|---|---|
| 1 | 49.17 | 57 | 6.9 | 52.63 |
| 2 | 49.17 | 60 | 2.7 | 54.41 |
| 3 | 49.17 | 60 | 4.9 | 53.83 |

As seen, the output concentration of an organic-inorganic hydrocolloid could be varied with small changes in the pressure in the evaporation zone alone or in combination with small changes in the temperature of the input material. Substantially no dried material was observed on the inner surface of the evaporation zone.

Example 4

Polymer Latex

Polymer latex was prepared according to Example 1 of U.S. Pat. No. 4,629,663 (Brown et al.) (which is incorporated herein by reference). It was pre-concentrated using an evaporation unit (Model RE111 Rotaevaporator, available from Büchi Laboratoriums-Technik AG, Switzerland) until a concentration of 57.75% dried solids was reached. This material was then processed according to Process A. The material was continuously fed through the heat exchanger, through the die and into the evaporation zone at one set of conditions of temperature and pressure. The product was then removed from the collection zone. The temperature in the heating zone and the pressure in the evaporation zone were then readjusted to produce products of different concentrations. For each set of conditions, samples of product were taken and analyzed for percent dried solids. The results are shown in Table 4.

TABLE 4

| Sample | Inlet Concentration (% Dried Solids by wt.) | Heat Exchanger Temperature (C.) | Evaporation Zone Pressure (kPa) | Outlet Concentration (% Dried Solids by wt.) |
|---|---|---|---|---|
| 1 | 57.75 | 51 | 2.7 | 60.41 |
| 2 | 57.75 | 52 | 2.7 | 60.77 |
| 3 | 57.75 | 52 | 2.9 | 60.88 |
| 4 | 57.75 | 52 | 4.0 | 59.94 |
| 5 | 57.75 | 52 | 6.7 | 59.23 |
| 6 | 57.75 | 53 | 4.9 | 59.66 |
| 7 | 57.75 | 53 | 4.9 | 59.51 |
| 8 | 57.75 | 59 | 2.7 | 61.01 |
| 9 | 57.75 | 59 | 2.7 | 60.92 |
| 10 | 57.75 | 60 | 6.7 | 59.93 |
| 11 | 57.75 | 60 | 6.7 | 59.84 |
| 12 | 57.75 | 61 | 3.9 | 60.51 |
| 13 | 57.75 | 61 | 4.0 | 60.68 |
| 14 | 57.75 | 67 | 7.2 | 60.97 |
| 15 | 57.75 | 68 | 2.7 | 61.59 |
| 16 | 57.75 | 69 | 2.7 | 61.70 |
| 17 | 57.75 | 69 | 4.5 | 60.99 |
| 18 | 57.75 | 69 | 4.7 | 61.08 |
| 19 | 57.75 | 69 | 7.2 | 60.82 |

As seen, the output concentration of polymer latex could be varied with small changes in the pressure in the evaporation zone alone or in combination with small changes in the temperature of the input material. Substantially no dried material was observed on the inner surface of the evaporation zone.

Example 5
Inorganic Sol

A sample of dilute sol of the type disclosed in U.S. Pat. No. 3,795,524 (Sowman) (which is incorporated herein by reference) was pre-concentrated by a batch evaporation process and placed in the feed vessel. The material was processed according to Process B. The material was continuously fed through the heat exchanger, through the die and into the evaporation zone, and then removed from the collection zone. The temperature in the heating zone and the pressure in the evaporation zone were continuously adjusted to achieve the desired concentration of the sol. Several different conditions of initial concentration, temperature, and pressure were tested. For each set of conditions, samples of product were taken and analyzed for percent fired solids. The results are shown in Table 5.

TABLE 5

| Sample | Inlet Concentration (% Fired Solids by wt.) | Heat Exchanger Temperature (C.) | Evaporation Zone Pressure (kPa) | Feed Rate (mL/min) | Outlet Concentration (% Fired Solids by wt.) |
|---|---|---|---|---|---|
| 1-1 | 30.74 | 55 | 3.1 | 100 | 31.82 |
| 1-2 | 30.74 | 57 | 2.9 | 300 | 31.68 |
| 1-3 | 30.74 | 57 | 5.5 | 198 | 31.48 |
| 1-4 | 30.74 | 58 | 2.7 | 275 | 31.79 |
| 1-5 | 30.74 | 58 | 4.4 | 198 | 31.64 |
| 1-6 | 30.74 | 62 | 4.8 | 293 | 31.62 |
| 2-1 | 30.79 | 51 | 4.8 | 147 | 31.71 |
| 2-2 | 30.79 | 57 | 6.1 | 147 | 31.67 |

As seen, the output concentration of a different inorganic sol could be varied with small changes in the pressure in the evaporation zone alone or in combination with small changes in the temperature of the input material. Substantially no dried material was observed on the inner surface of the evaporation zone.

What is claimed is:

1. A process for evaporating a portion of a colloidal solution, said process comprising:
   a. passing a colloidal solution, said colloidal solution comprising particles in a liquid medium, wherein at least a portion of said liquid medium comprises at least one volatile component, through at least one orifice into an evaporation zone that has at least one inner surface, wherein said colloidal solution does not substantially contact said at least one inner surface of said evaporation zone as said colloidal solution is passed through said evaporation zone;
   b. applying pressure in said evaporation zone that is lower than the vapor pressure of said colloidal solution as it is passed into said evaporation zone, allowing for flash evaporation of an amount of at least a portion of said at least one volatile component from said colloidal solution;
   c. adjusting the pressure in said evaporation zone to evaporate said amount of said at least one volatile component from said colloidal solution; and
   d. collecting the remaining colloidal solution from said evaporation zone.

2. The method of claim 1 wherein said colloidal solution is preconcentrated prior to being passed to said evaporation zone.

3. The method of claim 1 wherein said at least one orifice is shaped such that a desired surface area of said colloidal solution is exposed in said evaporation zone.

4. The method of claim 1 wherein said colloidal solution is a sol.

5. The method of claim 1 wherein the pressure in said evaporation zone is adjusted using at least one pressure sensor.

6. The method of claim 1 wherein the temperature of the colloidal solution prior to said colloidal solution passing into said evaporation zone is regulated, using at least one temperature sensor.

7. The method of claim 1 wherein a conditions sensor monitors the conditions of the remaining colloidal solution after it is collected.

8. The method of claim 1 wherein conditions or properties of the remaining colloidal solution are controlled by regulating the pressure in said evaporation zone and/or by regulating the temperature of the colloidal solution prior to said colloidal solution passing into said evaporation zone.

9. A process for evaporating a portion of a colloidal solution, said process comprising:

a. heating said colloidal solution, said colloidal solution comprising particles in a liquid medium, wherein at least a portion of said liquid medium comprises at least one volatile component, in a heating zone under sufficient pressure to prevent said colloidal solution from boiling in said heating zone;

b. passing said colloidal solution through at least one orifice into an evaporation zone that has at least one inner surface, wherein said colloidal solution does not substantially contact said at least one inner surface of said evaporation zone as said colloidal solution is passed through said evaporation zone;

c. applying pressure in said evaporation zone that is lower than the vapor pressure of said colloidal solution as it is passed into said evaporation zone, allowing for flash evaporation of an amount of said at least one volatile component of the colloidal solution from said colloidal solution;

d. adjusting the temperature in said heating zone and the pressure in said evaporation zone to allow for evaporation of said amount of said at least one volatile component from said colloidal solution; and e. collecting said remaining colloidal solution from said evaporation zone.

10. The method of claim 9 wherein the pressure in the evaporation zone is adjusted using one or more pressure sensors.

11. The method of claim 9 wherein the temperature of the colloidal solution prior to said colloidal solution passing into said evaporation zone is adjusted using at least one temperature sensor.

12. The method of claim 9 wherein a conditions sensor monitors the conditions of the remaining colloidal solution after it is collected.

13. The method of claim 9 wherein conditions or properties of the remaining colloidal solution are controlled by regulating the pressure in said evaporation zone and/or by regulating the temperature of the colloidal solution prior to said colloidal solution passing into said evaporation zone.

14. The method of claim 9 wherein said colloidal solution is preconcentrated prior to being passed to said heating zone.

15. The method of claim 9 wherein said at least one orifice is shaped such that a desired surface area of said colloidal solution is exposed in said evaporation zone.

* * * * *